United States Patent
Varin

(10) Patent No.: US 8,894,809 B2
(45) Date of Patent: Nov. 25, 2014

(54) METHOD FOR DISCONNECTING, BY INDUCTION, A MAGNETIC MECHANICAL PART ADHERED TO A MECHANICAL PART

(75) Inventor: Franck Bernard Leon Varin, Voulangis (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 13/979,031

(22) PCT Filed: Jan. 6, 2012

(86) PCT No.: PCT/FR2012/050040
§ 371 (c)(1),
(2), (4) Date: Jul. 10, 2013

(87) PCT Pub. No.: WO2012/095594
PCT Pub. Date: Jul. 19, 2012

(65) Prior Publication Data
US 2013/0276991 A1    Oct. 24, 2013

(30) Foreign Application Priority Data

Jan. 11, 2011    (FR) ..................... 11 50217

(51) Int. Cl.
| | |
|---|---|
| F01D 5/00 | (2006.01) |
| B29C 73/34 | (2006.01) |
| F01D 5/14 | (2006.01) |
| H05B 6/10 | (2006.01) |
| H05B 6/14 | (2006.01) |
| B29L 31/08 | (2006.01) |
| B29C 65/48 | (2006.01) |
| B29C 65/00 | (2006.01) |
| B29C 35/08 | (2006.01) |
| B29C 65/76 | (2006.01) |

(52) U.S. Cl.
CPC ............... *B23B 38/10* (2013.01); *F01D 5/005* (2013.01); *F05D 2240/303* (2013.01); *B29L 2031/082* (2013.01); *B29C 65/48* (2013.01); *B29C 73/34* (2013.01); *B29C 66/721* (2013.01); *B29C 2035/0811* (2013.01); *B29C 66/301* (2013.01); *B29C 66/742* (2013.01); *F01D 5/147* (2013.01); *B29C 65/76* (2013.01); *B29C 66/532* (2013.01); *H05B 6/105* (2013.01); *H05B 6/14* (2013.01); *Y02T 50/672* (2013.01)
USPC ............ 156/712; 156/711; 156/752; 156/753

(58) Field of Classification Search
None
See application file for complete search history.

(56) References Cited

U.S. PATENT DOCUMENTS

| | | | | |
|---|---|---|---|---|
| 4,596,338 A | * | 6/1986 | Yousif | ............................ 215/232 |
| 4,895,322 A | * | 1/1990 | Zieve | ........................ 244/134 R |

(Continued)

FOREIGN PATENT DOCUMENTS

| | | |
|---|---|---|
| EP | 1 302 562 | 4/2003 |
| EP | 2 018 088 | 1/2009 |
| JP | 2001 41002 | 2/2001 |

OTHER PUBLICATIONS

International Search Report Issued Apr. 19, 2012 in PCT/FR12/050040 filed Jan. 6, 2012.

*Primary Examiner* — Philip Tucker
*Assistant Examiner* — Nickolas Harm
(74) *Attorney, Agent, or Firm* — Oblon, Spivak, McClelland, Maier & Neustadt, L.L.P.

(57) ABSTRACT

A method for disconnecting a first mechanical part from a second magnetic mechanical part, the first mechanical part being adhered to the second magnetic mechanical part by an adhesive film along a connecting area. In the method, a magnetic field is generated at least within the connecting area so as to generate, by induction, eddy currents in the second magnetic mechanical part, to soften the adhesive film and enable disconnection of the first and second mechanical parts.

8 Claims, 1 Drawing Sheet

(56) References Cited

U.S. PATENT DOCUMENTS

| | | |
|---|---|---|
| 7,569,624 B2 * | 8/2009 | Kolbe et al. .................... 523/200 |
| 2002/0106522 A1 * | 8/2002 | McCormack et al. ........ 428/469 |
| 2003/0071019 A1 | 4/2003 | Cline et al. |
| 2004/0091694 A1 * | 5/2004 | Holzer et al. ................. 428/323 |
| 2007/0062643 A1 * | 3/2007 | Watanabe et al. ............ 156/344 |
| 2009/0057297 A1 | 3/2009 | Boschet et al. |
| 2009/0111279 A1 * | 4/2009 | Sakashita ..................... 438/761 |
| 2012/0034407 A1 * | 2/2012 | Yamanaka et al. ........... 428/40.2 |

\* cited by examiner

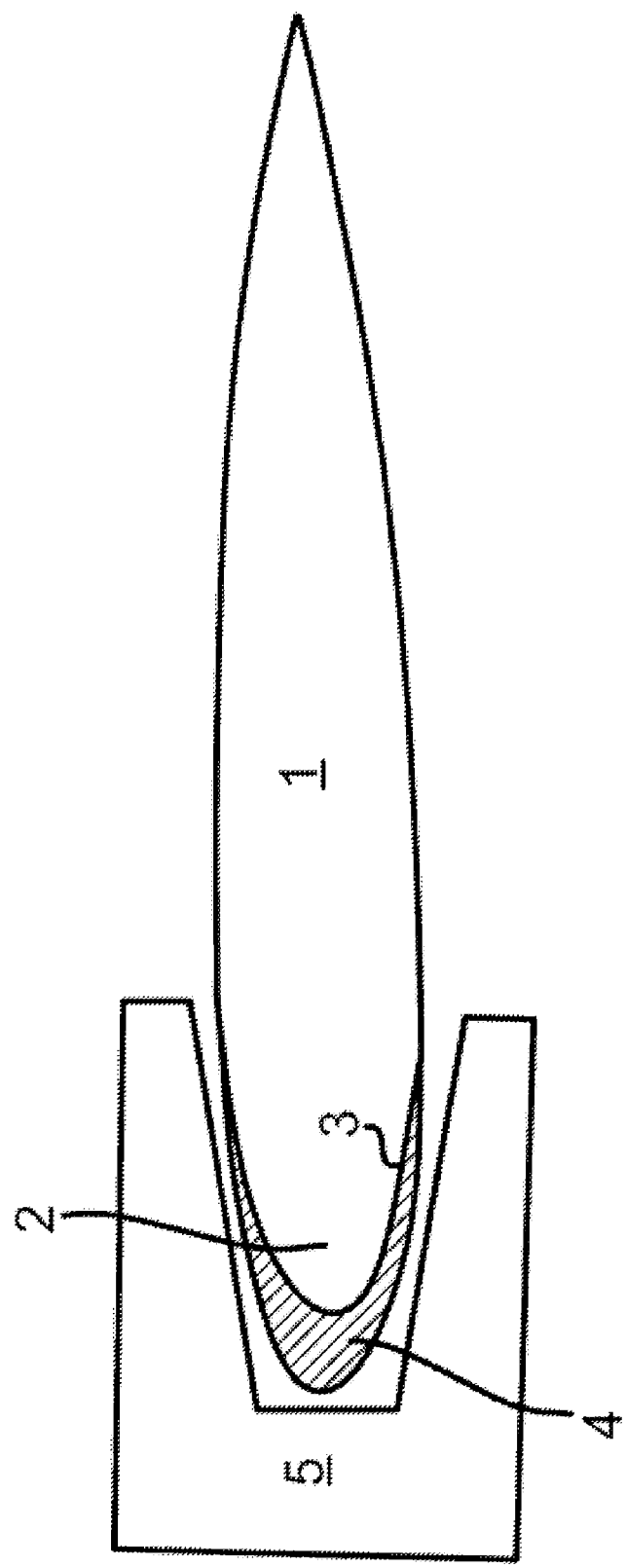

METHOD FOR DISCONNECTING, BY INDUCTION, A MAGNETIC MECHANICAL PART ADHERED TO A MECHANICAL PART

The invention relates to the field of maintenance of mechanical assemblies and, more particularly, to the replacement of a damaged magnetic mechanical part of an aircraft turboshaft engine.

An aircraft turboshaft engine includes blades having a body made of composite material the leading edge of which is covered with a metal shield. The blade body made of composite material typically comprises a carbon-fibre-reinforced thermosetting resin. In a classic way, the metal shield is solidly connected to the leading edge of the blade by means of an adhesive film covering its internal part. In the course of time, the shield deteriorates and it is necessary to replace it during a maintenance operation during which the blade undergoes different machining steps (cleavage, peeling, pulling, etc.) in order to remove the worn shield. After the appropriate checks and surface preparations, a new metal shield is adhered to the edge of the blade using an adhesive film.

Such a maintenance process presents several drawbacks. First of all, the successive machining steps may damage the blade and cause the tearing-out of fibres from the blade body, which limits the lifetime of the blade or lead to its scrapping.

On the other hand, the use of a conventional convection, conduction or radiant heating with the aim of weakening the adhesion features of the adhesive film and facilitating its removal proves to be impossible without risking damaging the resin of the blade body and degrading the geometrical quality of the blade made of composite material.

A maintenance process as described above is therefore not adapted to meet current needs.

Although the invention arose from a problem of maintenance of a turboshaft engine blade, the invention generally relates to the replacement of any magnetic mechanical part that is solidly connected to another mechanical part by means of an adhesive film.

For that purpose, the invention relates to a method for disconnecting a first mechanical part from a magnetic second mechanical part, the first mechanical part being adhered to the magnetic second mechanical part by means of an adhesive film along a connecting area, a method wherein a magnetic field is generated at least in the connecting area so as to generate, by induction, eddy currents in the magnetic second mechanical part in order to soften the adhesive film and enable the disconnecting of the mechanical parts.

The generation of a magnetic field makes it possible to disconnect the magnetic second mechanical part without having recourse to machining which could alter one or the other of the mechanical parts. The magnetic field induces eddy currents in the second mechanical part and heats it because of its magnetic nature. The rise in temperature of the connection surface of the magnetic second mechanical part causes, on the one hand, the heating of the adhesive film which softens and loses part of its adhesive properties and, on the other hand, a thermal dilatation of the magnetic second mechanical part. The thermal dilatation between the two mechanical parts leads to a mechanical cutting between the adhesive film and the magnetic second mechanical part. The disconnecting of the magnetic second mechanical part therefore requires no machining.

Preferably, only the connecting area is placed into the magnetic field, which makes it possible to locally heat the magnetic second mechanical part without modifying its lifetime.

Besides, the invention relates to a method for solidly connecting a first mechanical part to a magnetic second mechanical part, method wherein an adhesive film is applied between the first mechanical part and the magnetic second mechanical part along a connecting area, a magnetic field is generated at least in the connecting area so as to generate, by induction, eddy currents in the magnetic second mechanical part in order to polymerize the adhesive film and solidly connect the two mechanical parts.

The application of a magnetic field makes it possible to solidly connect the two mechanical parts quickly by creating only a localized heating.

Preferably, only the connecting area is placed into the magnetic field, which makes it possible to heat the magnetic second mechanical part locally without modifying its lifetime.

Preferably, the first mechanical part is a part made of composite material, preferably non-magnetic. A mechanical part made of composite material cannot be heated by induction, which makes it possible to avoid its damaging.

Preferably, the first mechanical part is a turboshaft engine blade. A turboshaft engine blade must have a surface that is free from any score. The implementation of such processes for a turboshaft engine blade makes it possible to ensure the integrity of the blade.

Still preferably, the turboshaft engine blade is made of a composite material, preferably having an organic matrix. Such a composite material is generally non-magnetic and does not conduct eddy currents, only the adhesive film being heated by the magnetic second mechanical part during the implementation of the method for solidly connecting or disconnecting, the turboshaft engine blade being thus not heated as such. Besides, induction heating is very brief, which limits the risk of heat damage to a blade which is made of composite material formed from thermosetting resin and which is reinforced with carbon fibres. Furthermore, the composite material is not modified by the machining steps implemented during the disconnection processes. The contact area of the composite part undergoes no more tearing-out of fibres.

According to a preferred aspect of the invention, the magnetic second mechanical part is a shield for a turboshaft engine blade. Such a shield, preferably made of metal, is magnetic by nature and enables the circulation of eddy currents. In an advantageous way, the removing of a damaged shield from a turboshaft engine blade and/or the laying of a new one is simple and quick, the adhesive film being locally heated by the shield which must be removed or laid. While the magnetic field is generated, only the metal shield, which is sensitive to magnetic field, warms up, making it possible to fully preserve the properties of the blade made of composite material, in particular the properties of the resin of the composite material.

Preferably, as the turboshaft engine blade comprises a leading edge, the shield is arranged to be adhered to the leading edge of the blade.

According to another aspect of the invention, the first mechanical part is a turboshaft engine casing and the second mechanical part is a magnetic insert arranged to enable the mounting of equipment on the turboshaft engine casing.

The invention will be better understood by reading the following description which is given only as an example, in reference to the accompanying drawing in which the only FIGURE schematically shows, according to a sectional view, a turboshaft engine blade the leading edge of which is covered with a shield, the leading edge of the blade being placed into a magnetic field generated by an inductor.

The invention is set forth, in reference to the only FIGURE, for a turboshaft engine blade 1 having a leading edge 2 which is covered with a shield 4, the shield 4 being adhered to the leading edge 2 by means of an adhesive film 3 along a connecting area. In other words, the said adhesive film 3 is situated between the leading edge 2 of the blade 1 and the shield 4 as shown in the only FIGURE.

Herein the shield 4 is made of metal but it is obvious that other magnetic materials could be suitable.

To disconnect the shield 4 from the leading edge 2 of the blade 1, the leading edge 2 is placed into a magnetic field generated by an inductor 5 which is schematically shown in the only FIGURE. Preferentially, only the connecting area of the leading edge 2 that is covered with the adhesive film 3 is placed into the magnetic field.

Under the influence of the magnetic field, the metal shield 4 warms up because of eddy currents generated by induction and transmits calories to the adhesive film 3. The adhesive film warms up, softens and its mechanical characteristics decrease. Besides, the shield 4 dilates thermally with regard to the blade 1, which causes shear stress activity which causes the shield 4 to disconnect from the leading edge 2 of the blade 1. The shield 4 can then be removed from the leading edge 2. In an advantageous way, no machining step is implemented and so the risk of damaging the blade 1 can be limited. This is particularly advantageous for a blade made of composite material 1 which is vulnerable to machining operations.

The induction heating presents no risk for a composite blade 1 given that a composite blade, in particular a composite blade with an organic matrix, is not magnetic and does not enable the circulation of electrons that generate eddy currents. As a result, only the adhesive film 3 warms up on contact with the magnetic shield 4, the risk of heat damage to the composite blade 1 being greatly reduced.

Induction heating makes it possible to connect a new shield solidly to the leading edge 2 of the blade 1, in particular after removal of the damaged shield.

To connect a shield 4 solidly to the leading edge 2 of a blade made of composite material 1 an adhesive film 3 is applied between the leading edge 2 and the shield 4 that has just been heated by induction by means of an inductor 5. The adhesive film 3 polymerizes under the influence of the heat generated by circulation of eddy currents in the shield 4. The shield 4 is hold in position on the leading edge 2 and the heating of the adhesive film 3 is stopped. The latter solidifies while solidly connecting the shield 4 to the leading edge 2. The obtained blade 1 can then be mounted on a turboshaft engine.

As an example, a shield 4 made of titanium is solidly connected to a leading edge 2 of a blade made of composite material 1, preferably organic, which includes carbon fibres. According to a preferred embodiment, a glue of the epoxy type, which is laid to a thickness of the order of one millimeter, is used. It is obvious that the value of the magnetic field generated by the inductor must be adapted according to the utilized glue and the constituent materials of the parts to be solidly connected/disconnected.

The invention was explained for solidly connecting/disconnecting a shield to/from a turboshaft engine blade but, of course, it applies to any connecting/disconnecting of a first mechanical part to/from a magnetic second mechanical part. The aim of the invention is among other things to replace a magnetic metal insert on a turboshaft engine casing, preferably made of composite material with an organic matrix. Such a metal insert enables in particular the mounting of equipments on the turboshaft engine casing.

The invention claimed is:

1. A method for disconnecting a first mechanical part from a magnetic second mechanical part, the first mechanical part being adhered to the magnetic second mechanical part by an adhesive film along a connecting area, the method comprising:

generating a magnetic field, at least in the connecting area, so as to generate by induction eddy currents in the magnetic second mechanical part to soften the adhesive film and enable disconnecting of the first and second mechanical parts.

2. A method according to claim 1, wherein the first mechanical part is a part made of composite material or is non-magnetic.

3. A method according to claim 1, wherein the first mechanical part is a turboshaft engine blade.

4. A method according to claim 3, wherein the turboshaft engine blade is made of a composite material having an organic matrix.

5. A method according to claim 3, wherein the magnetic second mechanical part is a shield for a turboshaft engine blade.

6. A method according to claim 5, wherein the shield is made of metal.

7. A method according to claim 3, wherein, the turboshaft engine blade includes a leading edge, and the shield is arranged to be adhered to the leading edge of the blade.

8. A method according to claim 1, wherein the first mechanical part is a turboshaft engine casing and the magnetic second mechanical part is a magnetic insert.

\* \* \* \* \*